United States Patent [19]

Reynolds

[11] 4,382,334

[45] May 10, 1983

[54] CHAIN SAW DEVICE

[75] Inventor: Michael J. Reynolds, Gladstone, Oreg.

[73] Assignee: Omark Industries, Inc., Portland, Oreg.

[21] Appl. No.: 279,531

[22] Filed: Jul. 1, 1981

[51] Int. Cl.³ .............................................. B27B 17/02
[52] U.S. Cl. ........................................ 30/386; 83/816; 144/73; 30/382
[58] Field of Search .................. 30/381, 382, 383, 384, 30/385, 386; 144/73; 83/816

[56] References Cited

U.S. PATENT DOCUMENTS

| | | | |
|---|---|---|---|
| 830,860 | 9/1906 | Smith | 30/386 X |
| 853,350 | 5/1907 | Fullerton | 30/384 |
| 893,897 | 7/1908 | Bens | 30/385 |
| 2,774,395 | 12/1956 | Tweedie | 30/386 |
| 3,593,804 | 7/1971 | Snider | 30/381 X |
| 4,272,889 | 6/1981 | Scott et al. | 30/382 X |
| 4,316,327 | 2/1982 | Scott et al. | 30/386 |

Primary Examiner—Jimmy C. Peters
Attorney, Agent, or Firm—Klarquist, Sparkman, Campbell, Leigh, Whinston & Dellett

[57] ABSTRACT

A chain saw is provided with a saw chain cassette and a releasable clamping cover for holding the cassette against the side of the chain saw frame. The clamping cover, together with the cassette and the chain saw frame, have aligning surfaces extending in a direction longitudinal of the cassette saw bar for preventing relative rotation between the saw bar and the frame. A tightening mechanism for the cassette is used for urging the saw bar forwardly with respect to its drive sprocket and a further mechanism is provided within the cassette comprising a spring biased shoe for urging the cassette sprocket in a direction for tightening the chain when the cassette is removed from the chain saw frame. A camming device on the frame engages the shoe when the cassette is installed on the frame for holding the shoe away from the sprocket such that the latter can be driven by the chain saw motor drive shaft.

22 Claims, 14 Drawing Figures

CHAIN SAW DEVICE

BACKGROUND OF THE INVENTION

The present invention relates to a chain saw device including a self-contained cassette adapted for installation on a chain saw, and particularly to a cassette which can be easily and quickly installed or removed from the chain saw.

A saw chain cassette typically includes a saw bar having a peripheral groove for guiding a saw chain adapted to be driven by a drive sprocket also incorporated into the cassette. The cassette is attached to the frame of a chain saw as a unit and is replaced as a unit thereby avoiding the necessity for removing an old chain from a saw bar and replacing the same with a new chain in proper entrained relationship with the saw bar and sprocket, the latter task being time consuming and requiring a degree of skill. However, prior cassettes are usually bolted to the chain saw frame in a manner similar to the mode of attachment of a conventional saw bar, and unless a number of bolts are employed the cassette is apt to wobble in a vertical direction during use, i.e. in a clockwise or counterclockwise direction with respect to the driving motor shaft. Furthermore, the saw bar sprocket, even though a part of the cassette, often is secured to the chain saw motor shaft employing a threaded connector or the like. Therefore even the installation of a cassette has been somewhat time consuming.

Moreover in a cassette configuration the sprocket is usually movable along the cassette saw bar so as to permit proper adjustment in the tensioning of the chain. The riveted connections of the chain tend to become loose with age whereby the chain actually appears to increase in overall length. The proper tension must be maintained in order that the chain will properly track around the saw bar and over the sprocket rather than becoming loose and behaving erratically or even slipping off the saw bar. Although the saw bar of the conventional cassette is releasably bolted to the chain saw and may be periodically unbolted and adjusted in such a manner that the proper saw chain tension is achieved, nevertheless when the cassette is removed from the chain saw or temporarily stored the sprocket is free to move relative to the bar and the chain can become disengaged and require re-attaching around the bar and sprocket. If the chain should become partially disengaged from the saw bar when the cassette is not in use, and if the cassette is then connected in operative position on the chain saw frame, a dangerous situation can arise wherein the saw chain may rapidly disengage from the saw bar.

SUMMARY OF THE INVENTION

According to the present invention in preferred embodiments thereof, a chain saw is provided with a rapidly attachable cassette comprising a saw bar having a saw chain entrained therearound and a sprocket for engaging the chain and adapted to be driven by the chain saw motor. A movable clamping cover is configured for interengagement with the frame and secures the cassette against the frame by releasable compression to provide for rapid insertion and removal of the cassette. The sprocket as well as the chain saw motor shaft are preferably provided with splined connections which are quickly engaged as the cassette is mounted on the frame.

According to one embodiment, the cover is hingedly attached to the frame and is provided with an over-center locking mechanism for releasably holding the cover against the frame with the cassette in place. It is also preferred the cover and the frame have longitudinally oriented aligning surfaces for engaging other longitudinally oriented aligning surfaces on the cassette when the cassette is disposed in clamped relation on the frame such that clockwise or counterclockwise movement of the cassette is restrained and the cassette is securely held for sawing. However, the cassette is movable longitudinally, particularly with the cover in non-clamping relation, for placing the proper tension on the chain.

Further in accordance with a preferred embodiment of the present invention the chain saw is not only provided with means for placing the chain under proper tension when disposed on the chain saw frame, but also the chain is tensioned when the cassette is removed from the chain saw frame. When the cassette is removed, biasing means mounted thereon urges the sprocket in a direction for tightening the chain, but a cam member mounted on the frame disengages such biasing means when the cassette is remounted on the frame whereby the cassette sprocket is free to be rotated by the shaft of the chain saw motor.

It is accordingly an object of the present invention to provide an improved chain saw device incorporating a saw chain cassette that can be rapidly and easily but securely attached and removed from the chain saw frame.

It is another object of the present invention to provide an improved saw chain cassette wherein the saw chain entrained therearound is kept in tightened condition even though the cassette is removed from a chain saw.

It is another object of the present invention to provide an improved chain saw device incorporating a cassette which may be rapidly and easily attached and removed from a chain saw without the use of tools.

It is another object of the present invention to provide an improved chain saw device incorporating a cassette wherein the cassette's saw chain is maintained in properly tensioned condition.

It is another object of the present invention to provide an improved chain saw device incorporating a cassette wherein said cassette is easily installed and removed, but wherein said cassette in mounted position is secured against wobble or rotational movement with respect to the axis of the chain saw motor.

The subject matter which I regard as my invention is particularly pointed out and distinctly claimed in the concluding portion of this specification. The invention, however, both as to organization and method of operation, together with further advantages and objects thereof, may best be understood by reference to the following description taken in connection with the accompanying drawings wherein like reference characters refer to like elements.

DETAILED DESCRIPTION

Referring to the drawings and particularly to FIGS. 1 through 10 illustrating a first embodiment of the present invention, a chain saw 10 includes a chain saw housing or frame 12 having a motor housing 14 and a handle 16. A saw chain cassette 18, which is attachable to and detachable from the frame as a unit, comprises a saw bar 20 guiding a saw chain 22 driven by a drive sprocket 24 provided with a splined connection for receiving the splines of motor shaft 26.

The cassette further includes a sprocket entrapping portion 28 suitably formed of metal and joined to saw bar 20 by means of rivets 30. The entrapping portion has an outward half 28a and an inward half 28b, the latter being disposed directly against the frame 12 of the chain saw when the cassette is secured in position. Half of the entrapping portion is located on each side of saw bar 20 with the halves being widely enough separated to provide a cavity 60 for receiving sprocket 24 together with chain 22 passing therearound. The halves have aligned longitudinal slots 32 for receiving boss portions or hubs 34 of sprocket 24 such that the sprocket is relatively movable longitudinally along the cassette. At the rear end of the sprocket entrapping portion, halves 28a and 28b are joined by rivet 36 where the halves are provided with inwardly extending, abutting lands 39 and 41.

The entrapping portion halves are generally flat for extending longitudinally rearwardly of saw bar 20 and are centrally wider in a vertical direction than saw bar 20 substantially to enclose the sprocket 24 as well as the chain passing therearound at points rearwardly of the sprocket axis. Entrapping portion half 28a includes upper and lower edge ridges or ribs 38 and 40 which extend laterally outwardly of the cassette from half 28a, while entrapping portion half 28b similarly includes upper and lower edge ridges or ribs 42 and 44 which extend laterally outwardly of the cassette in the opposite direction. These edge ridges or ribs perform two functions. They provide stiffening for the metallic or other material from which the entrapping portion is formed. Moreover, they provide aligning surfaces which are engaged as the cassette is secured against the chain saw frame for accurately positioning and holding the cassette. Rib 38 inclues rib portions 38a and 38b which are aligned in a direction longitudinal of the cassette and saw bar and respectively forward and rearward of sprocket receiving slot 32. Similarly, rib 40 includes portions 40a and 40b which are aligned in a direction longitudinal of the cassette and saw bar and respectively located forwardly and rearwardly of the sprocket receiving slot 32. Furthermore, ribs 42 and 44 include forward portions 42a and 44a which are located forwardly of sprocket receiving slot 32, and rearward portions 42b and 44b located rearwardly of the sprocket receiving slot, all of which extend in a direction longitudinal of the saw bar and cassette. Ribs 42a, 44a, 42b and 44b are in substantial alignment with ribs 38a, 40a, 38b and 40b respectively on the opposite side of the cassette.

The chain saw further comprises a clamping cover 46 which is hingedly attached at 48 to the lower side of frame 12 and which closes over the end of shaft 26 and the cassette, with the cassette's sprocket entrapping portion being receivable between the cover and the frame. In this embodiment, the cover 46 is held closed against the frame by means of over-center latching or locking mechanism 49 which is effective to urge the clamping cover toward the cassette and the frame and hold the cassette against the frame by releasable compression. At such time the splined motor shaft 26 is matingly received along the internal splines of the sprocket hubs 34.

Locking mechanism 49 suitably takes the form of a draw catch comprising a handle 53 hingedly attached at 55 to the upper side of the frame, near cover 46, and extending generally perpendicularly therefrom. The handle pivotally carries a loop 57 adapted for securely engaging hook member 59 on the cover, with the loop extending under the hinge axis of the handle in an over-center locking configuration. The free end of the handle may be upraised to loosen the cover, but must be further raised against the pressure of spring abutment 61, as it strikes the hinge support at 55, for actually disengaging the loop from hook member 59.

The inside of the cover 46 is provided with upstanding metal pads 50a and 50b which extend inwardly from the inner surface of the cover and which are substantially rectangular, having large radius curved faces adapted to engage the flat sides of the sprocket entrapping portion half 28a of the cassette in areas 52a and 52b respectively. The pad 50a is matingly received between ribs 38a and 40a located immediately on either side thereof while the pad 50b is matingly received between ribs 38b and 40b immediately on either side thereof for holding the cassette in position and arresting clockwise or counterclockwise movement thereof during operation of the saw. Furthermore, the frame 12 facing outwardly toward the cover is provided with outwardly directed upstanding metal pads 54a and 54b having substantially flat forward surfaces for engaging the flat side of entrapping portion half 28b in areas 56a and 56b. The pad 54a is matingly receivable between ribs 42a and 44a which are then positioned immediately on either side of the pad for cooperating in holding the cassette in position. Pad 54b is also matingly receivable between ribs 42b and 44b. The abutting adjacent relation of the aforementioned ribs with the side edges of said pads substantially prevents rotational movement of the cassette and saw bar with respect to the axis of shaft 26, particularly since the pad and rib combination is located both forwardly and rearwardly of the sprocket axis.

With the cassette received in place on the saw frame and with cover 46 closed thereagainst and latched by over-center mechanism 49, the respective pads 50 and 54 hold the cassette securely in position by compression, but the latching mechanism is conveniently releaseable such that the cassette can be rapidly removed as well as rapidly reinserted into operating position. The cover 46 together with hinges 48 and latching mechanism 49 are configured such that the cover flexes slightly with the cassette in place and with latching mechanism 49 closed whereby to exert pressure against the cassette for holding the same tightly. The longitudinal direction of the aligning surfaces including the aforementioned ribs and pads does, however, allow for some longitudinal sliding movement between the cassette and the frame with the cassette in place, particularly with cover 46 open or closed loosely, for adjusting the tension on the saw chain.

Furthermore, the frame 12 where it faces the cassette is suitably provided with longitudinal ridges on either side of said pads to form grooves suitable for receiving ribs on the cassette. For instance referring to FIG. 5, the face 62 of frame 12 adjacent the cassette is somewhat inset from the cassette, while a lower longitudinally disposed ridge 64 separates the central face from a chip channel 66. The ridge 64 is spaced from pad 54a defining a groove 72 for receiving rib 44a of the cassette. Also, upper shelf 68 defines a lower longitudinal edge or ridge 70 spaced above pad 54a defining a groove 74 which can matingly receive rib 42a on the cassette, depending on the level of shelf 68. Rearward pad 54b is located between an inset upper wall portion 76 of the frame and a lower upstanding ridge 78, both wall 76 and ridge 78 extending longitudinally of the in-place cassette and in alignment with ridges 64 and 70. Wall 76 and ridge 78 are spaced to matingly receive therebetween the rear portion 80 of the cassette, while longitudinal grooves 73 and 75 suitable for receiving ribs 42b and 44b are provided in the frame immediately above and below pad 54b. Such additional aligning surfaces are of further advantage in accurately positioning and holding the cassette against rotation. In addition, longitudinal upper wall 82 of frame 12 suitably abuts the upper longitudinal portions 38c and 42c of ribs 38 and 42 at the upper edges of sprocket entrapping portion of the cassette.

The rib 38 extends diagonally downwardly from portion 38c to forward and rearward portions 38a and 38b to provide overall stiffening, while rib 40 similarly extends diagonally upwardly from a central longitudinal portion 40c to forward and rearward portions 40a and 40b. Rib 42 also extends diagonally downwardly from central portion 42c to forward portion 42a and rearward portion 42b while rib 44 extends diagonally upwardly from central longitudinal portion 44c to portions 44a and 44b for stiffening. Entrapping portion half 28b is cut out or indented farther at 84, extending rib 42b forwardly, to provide room for a sharpening mechanism 86 which will be hereinafter more fully described.

As mentioned above, the longitudinal orientation of the aligning surfaces allows for some longitudinal sliding movement between the cassette and the frame for adjusting the tension on the saw chain. The cassette is provided with slots 32 receiving the hubs 34 of the sprocket such that the saw bar carrying the chain can be moved forwardly, i.e. to the right in FIG. 2, relative to the sprocket for taking up slack in the chain and making sure the chain accurately tracks around the saw bar groove and over the sprocket. For the purpose of adjusting tension on the saw chain, means are provided for adjustably bearing on the cassette rearward of the sprocket receiving portion and for urging the saw bar forwardly relative to the chain. In the illustrated embodiment, this means comprises an adjustable mechanism 58 including an adjusting cap 88 for rotating a shank 90 threadably received through rear end wall 92 of the frame. The inner end of the shank rotatably receives a foot 94 which bears against the rear end of the cassette, such that rotation of the cap 88 adjusts the position of the cassette relative to sprocket 24. Shank 90 carries a head 81 (FIG. 9) having left-hand threads, the head being receivable into cavity 87 of foot 94 by way of mating left-hand threads 83 in the axial portion of the foot. Neck 85 of the shank is normally adjacent threads 83 whereby foot 94 is freely rotatable. A lock nut 96 is employed for securing the adjustment mechanism at a given setting. The cap 88 may comprise a torque limiting device which slips around the shank after a given torque setting is reached. Thus cap 88 suitably contains a head 91 secured to shank 90 and carrying a detent member 93 biased by spring 95 against cam surface 97. The latter provides slippage for clockwise movement exceeding a certain torque and has ratchet faces to allow positive withdrawal of the device when the cap is turned in a counterclockwise direction.

Thus the chain 22 can be properly tensioned when the cassette is located in place on the frame of the chain saw since mechanism 58 can be employed to urge the cassette forwardly with respect to motor shaft 26. However, when the cassette is removed from the frame, sprocket 24 is free to move along slots 32 and the chain 22 can become slack and even become disengaged from the groove of the saw bar and/or the sprocket. Not only is it difficult in such a situation to return the chain to its proper path, but also a dangerous situation can arise should the cassette be empowered by the motor shaft with the saw chain in "derailed" condition. According to an aspect of the present invention, a further chain tightening mechanism is provided which is operative when the cassette is removed from the frame. The additional chain tightening mechanism including biasing means located on the cassette for yieldably urging the sprocket in a rearward direction along the cassette (to the left in FIG. 2) for tightening the chain, and a cam member mounted on the frame for disengaging such chain tightening mechanism when the cassette is mounted on the frame. Thus, when the cassette is mounted on the frame, it is not desired the sprocket be tightened with respect to a relatively fixed saw bar in a manner inhibiting rotation of the sprocket, but it is desired instead that the saw bar be more positively adjusted with respect to the sprocket 24 relatively fixedly mounted at such time to the motor shaft.

In particular, the tightening mechanism effective when the cassette is removed from the frame comprises a shoe 98 disposed in cavity 60 between entrapping portion halves 28a and 28b and forward of sprocket 24.

Figure 1:
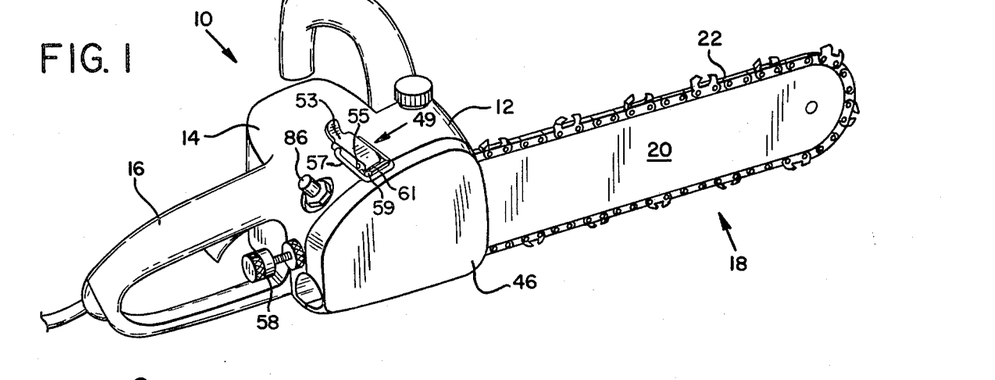
FIG. 1 is a perspective view of an improved chain saw device according to one embodiment of the present invention.
Figure 2:
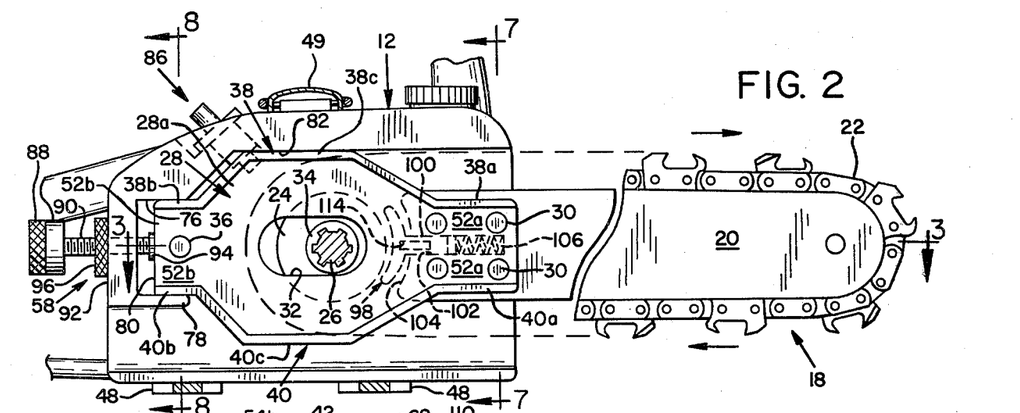
FIG. 2 is a fragmentary side view of the FIG. 1 chain saw device with its cassette clamping cover removed.
Figure 3:
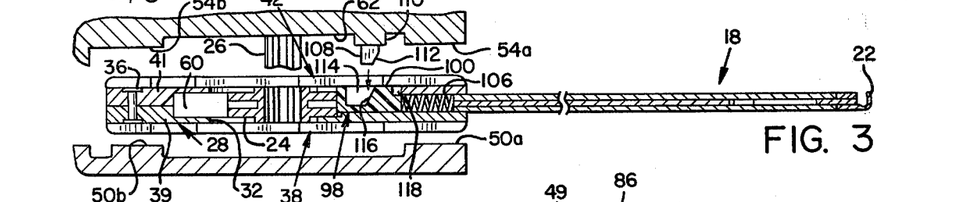
FIG. 3 is a fragmentary, horizontal, sectional view taken at 3—3 in FIG. 2, but with the saw chain cassette disengaged from the chain saw frame and with the clamping cover opened.

The sprocket 24 has a cylindrical periphery (having edge slots, not shown, for receiving drive links of chain 22) while shoe 98 is concave in the direction of sprocket 24, its surface comprising a segment of a cylinder matching the edge of sprocket 24. The shoe 98 is further provided with a stem 100 slidably received in slot 102 extending longitudinally forwardly from concave end 104 of saw bar 20. Also received within the slot 102 and forward of stem 100 is a spring 106 for urging the shoe 98 rearwardly (to the left in FIG. 2) against the periphery of the sprocket 24 (as illustrated in FIG. 3) thereby causing the sprocket to slide rearwardly along slots 32 for placing chain 22 under the proper tension. Thus, when the cassette is removed from the chain saw frame, the mechanism described places the saw chain in tension and prevents disengagement of the saw chain from the grooved edge of the saw bar or from the sprocket. The cassette can be stored in any convenient manner or even hung vertically from its rearward end without concern that the saw chain will become disengaged.

When the cassette is again mounted on the chain saw frame it is desired as indicated above that the saw chain not be tensioned in the same manner as it was when off the chain saw. For this purpose, a dog 108 is fixedly mounted on the saw chain frame between pads 54a and 54b. The dog is mounted on a short pedestal 110 having a face approximately in line with the outer faces of pads 54. The dog extends in perpendicular relation to the frame and has an angular forward edge or cam surface 112. The dog is receivable in a slot 114 in shoe 98 when the cassette is mounted on the frame, said slot extending longitudinally of the cassette and having an angular forward wall or cam surface 116 adapted to engage the aforementioned cam surface 112. Entrapping portion half 28b has a longitudinal slot 118 aligned with slot 102 in the saw bar for receiving an outwardly extending portion of shoe 98 and stem 100 within which the slot 114 is provided.

For installing the cassette 18 upon the frame 12, the mechanism 58 is suitably first operated for backing away the shoe 94 whereby the cassette will be able to clear the same. With cover 46 open, the sprocket is lined up with shaft 26 and urged thereupon via the splined interconnection as the cassette aligning surfaces on sprocket entrapping portion 28 are received against mating surfaces in the frame. At the same time, dog 108 is received in aperture 114 with cam surface 112 sliding against cam surface 116 for moving shoe 98 away from sprocket 24 against the pressure of spring 106 such that the sprocket will be free to turn. Mechanism 58 is then operated to apply predetermined pressure toward rear portion 80 of the cassette for maintaining the chain under proper tension. The cover is closed toward the cassette whereby pads 50a and 50b bear against aligning surfaces of the sprocket entrapping portion 28, and the over-center latching mechanism 49 is closed for securely holding the cassette in place. It is seen that installation of the cassette, as well as the reverse procedure for removal of the cassette, is simply and rapidly accomplished such that the chain saw can easily be provided with an entirely new chain without the cumbersome and lengthy process of entraining a different chain around a conventional saw bar affixed to a chain saw. At the same time, the cassette is held securely during sawing operation and the danger of the saw chain becoming "derailed" either during operation of the saw or during storage of the chain cassette is minimized.

Figure 4:
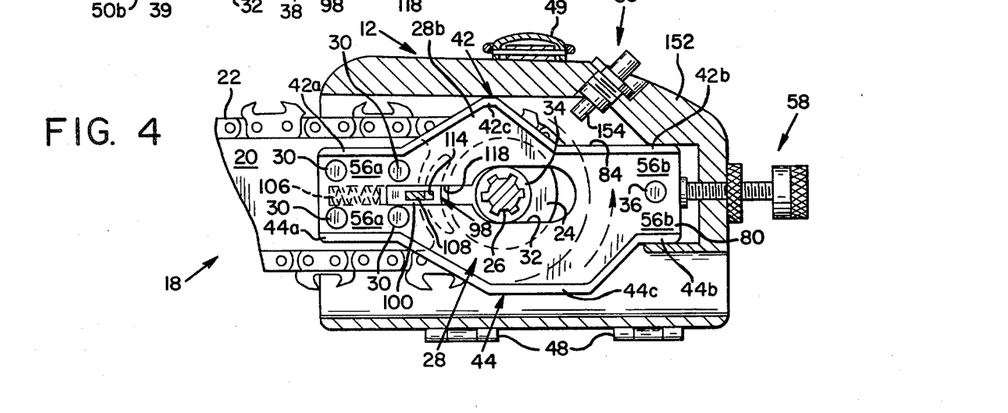
FIG. 4 is a fragmentary, vertical, sectional view of the chain saw device of FIG. 1 as taken through the frame mounted sharpening device in FIG. 1 and looking outwardly.
Figures 5, 6, 7, 8, 13, 14:
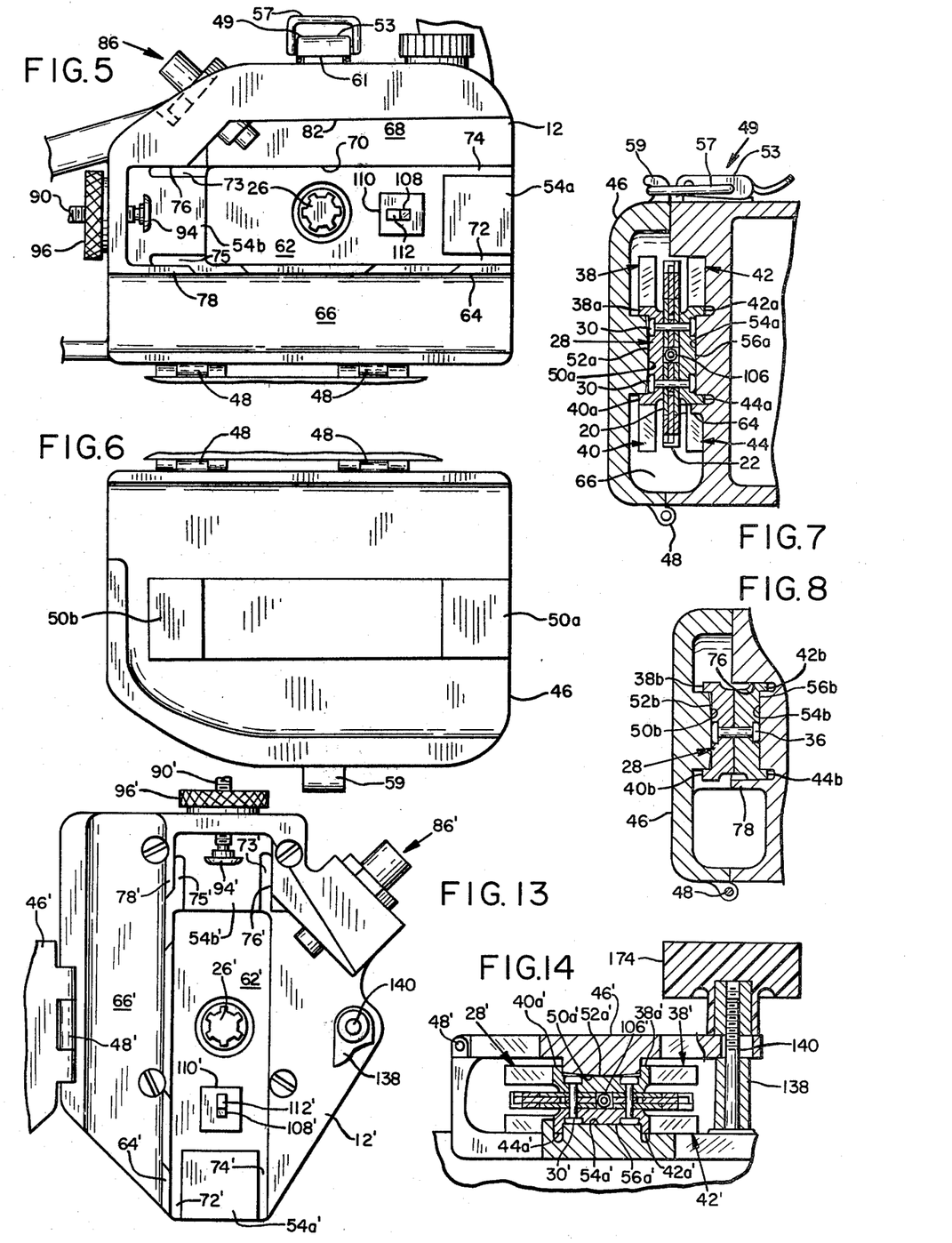
FIG. 5 is a detail view of a cassette receiving portion of the frame of the chain saw device according to the present invention with the cassette removed.
FIG. 6 is an inside view of a clamping cover of the chain saw device.
FIG. 7 is a transverse cross-sectional view taken at 7—7 in FIG. 2.
FIG. 8 is a transverse cross-sectional view taken at 8—8 in FIG. 2.
FIG. 13 is a view of a cassette receiving portion of the saw chain device frame according to the FIG. 11 embodiment with the cassette removed.
FIG. 14 is a transverse cross-sectional view taken at 14—14 in FIG. 12.
Figures 9, 10, 11:
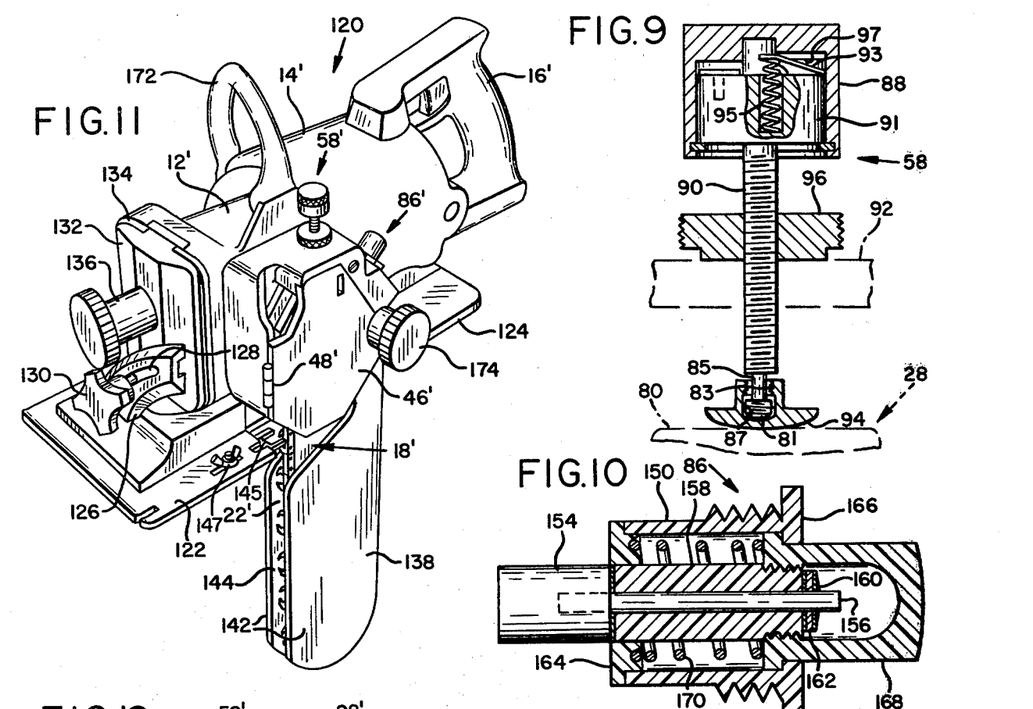
FIG. 9 is a vertical sectional view of a frame-mounted tensioning device employed with said chain saw.
FIG. 10 is a vertical sectional view of a sharpening device employed with said chain saw.
FIG. 11 is a perspective view of an improved chain saw device forming a second embodiment of the present invention.
Figure 12:
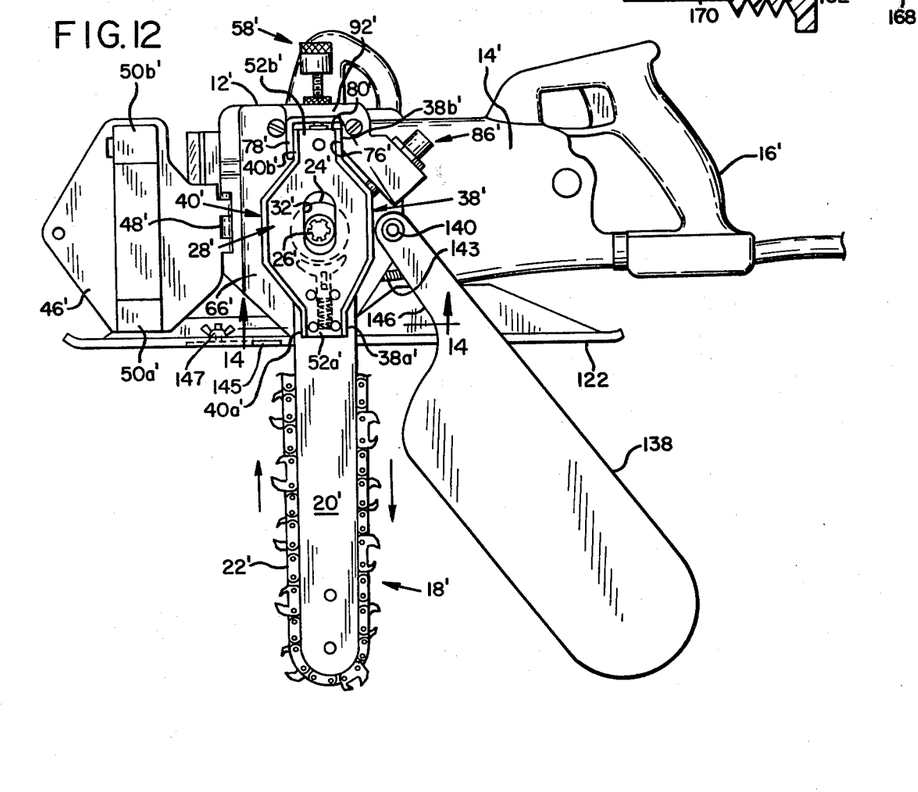
FIG. 12 is a side view of the FIG. 11 chain saw device with its clamping cover opened and its saw chain guard rotated away from the cassette.

The sharpening mechanism 86 includes a cylindrical outer body 150 which is threadably received in the upper rear diagonal wall portion 152 of frame 12 (FIG. 4). The sharpening device extends forwardly and downwardly and carries at its forward end a grindstone 154 mounted at the lower end of shaft 156 (FIG. 10), the latter extending through a cylindrical stone holder 158. The upper end of shaft 156 receives a compression washer assembly including Belleville spring 160 and pad 162 which secures the upper end of the shaft while permitting the stone to rotate. A compression cap 164 closes the lower end of body 150 and centers stone holder 158.

The upper end of body 150 is provided with a radial flange 166 which bears against the upper rear diagonal wall portion of the saw chain frame, said flange also extending inwardly defining an aperture entrapping a lower flanged portion of hollow cylindrical thumb knob 168 which is threadably joined to the exterior of stone holder 158. A coil spring 170 is disposed between the lower flanged portion of thumb knob 168 and compression cap 164 such that the stone holder 158 carrying grindstone 154 is normally urged upwardly away from the saw chain. However, downward pressure on thumb knob 168 extends grindstone 154 toward the path of saw chain 22 for sharpening top sharpenable teeth thereof. As hereinbefore mentioned, the rearward half 28b of the sprocket entrapping portion 28 of the cassette is suitably indented or cut away as illustrated at 84 to provide access for stone 154 to reach the chain.

Referring to FIGS. 11 through 14 illustrating a second embodiment of the present invention, a track saw 120 includes a housing or frame 12' having a motor housing 14', a rear handle 16' and a forward handle 172. A saw chain cassette 18' for use with the track saw includes a saw bar 20' guiding a saw chain 22' driven by a drive sprocket 24' having a splined connection for receiving the splines of motor shaft 26'. The cassette in this embodiment is adapted to extend downwardly from frame 12', i.e. in a generally vertical direction rather than generally horizontally as in the chain saw of the previous embodiment. The saw is thus adapted to operate in somewhat the manner of a circular saw with the added advantage that substantially straight cuts can be made rather than arcuate cuts as in the case of a circular saw. The cassette 18' is substantially identical to the cassette 18 of the previous embodiment and is provided with the same ridges or ribs for aligning and stiffening purposes.

For terminology purposes, the forward end of the cassette, as in the previous embodiment, is considered to be the end of the saw bar farthest from the frame, i.e. the cutting end of the saw bar, while the rearward end of the cassette is defined as the upper end or the end closest to the sprocket and the chain tightening mechanism on the saw frame. The cassette fits into the frame in a manner substantially similar to that described in connection with the previous embodiment. Primed reference numerals in FIGS. 11–13 refer to elements corresponding to those referenced by corresponding unprimed numerals in FIGS. 1–10.

The housing or frame 12' is provided with an adjustable guide shoe or foot 122 adapted to rest on the work to be sawn. Foot 122 is substantially L-shaped, being recessed at 124 to receive the downwardly extending cassette, and is provided with an upwardly extending arcuate bracket 126. Bracket 126 has an arcuate slot 128 for receiving a stud threadably engaged by hand-operated nut 130, the latter being securable against the bracket. The stud is based on a vertical, two part slide 132 movable along a mating guide portion 134 of the frame and secured thereagainst by means of hand-operated nut 136 which engages a threaded shank extending through both parts of the slide. The foot 122 may be moved in a vertical direction by loosening knob 136 and sliding elements 132 and 134 with respect to one another. Foot 122 can be angularly disposed with respect to the frame by first loosening hand-operated nut 130 and sliding bracket 126 with respect thereto. The saw is provided with a work engaging pressure plate 145 to limit splintering, said plate being adjustable by means of a slot and secured by a wing nut 147.

In this embodiment, a downwardly extending chain guard 138 is pivotally carried by a stud 140 extending perpendicularly outwardly from the frame at a location opposite cover hinge 48' and adjacent the cassette sprocket entrapping portion at the outward course of the chain. The chain guard has parallel sides 142 which, in the normal position of the guard, extend on both sides of the cassette and laterally encompass the saw bar and chain such that accidental engagement with the saw chain is prevented. The chain guard has a front opening 144 and is swingable away from the cassette, to the position illustrated in FIG. 12 for example, when the saw chain is engaged with a workpiece. The chain guard is narrowed toward stud 140 at 146 to pass around the edge of the cassette sprocket entrapping portion 28', and is normally spring biased by means of spring 143 to the closed or protective position illustrated in FIG. 11.

The clamping cover 46' is hingedly attached at 48' to the frame, but in this embodiment, instead of employing an over-center latch, the cover 46' opposite the hinge 48' is provided with an aperture for receiving the aforementioned stud 140. A hand-operated nut 174 threadably engages stud 140 and can be tightened down against clamping cover 46' when the cassette 18' is in place for securely holding the cassette.

The inside of cover 46' is provided with upstanding metal pads 50a' and 50b' which are substantially rectangular, having large radius convex faces adapted to engage the flat side of the sprocket entrapping portion 28 in areas 52a' and 52b' respectively. The pad 50a' is matingly received between ribs 38a' and 40a' while pad 50b' is matingly received between ribs 38b' and 40b' for holding the cassette in position and arresting clockwise or counterclockwise movement thereof. Furthermore, the frame 12' facing outwardly toward the cover (FIG. 13) is provided with outwardly directed upstanding metal pads 54a' and 54b' having substantially flat forward surfaces for engaging the flat side of entrapping portion 28' in areas corresponding to 56a and 56b in the previous embodiment. The pad 54a' is matingly receivable between ribs corresponding to 42a and 44a, while pad 54b' is matingly receivable between ribs corresponding to 42b and 44b in the previous embodiment, for cooperating in holding the cassette in position. As in the prior embodiment, frame 12' where it faces the cassette is also provided with longitudinal ridges on either side of said pads which may form grooves for receiving ribs on the cassette.

With the cassette received in place on the saw and with cover 46' closed thereagainst and latched by hand-operated nut 174, the respective pads 50' and 54' hold the cassette securely in position by compression, but the hand-operated nut 174 is conveniently releasable such that the cassette can be rapidly removed as well as rapidly inserted into operating position. The cover 46' together with hinge 48' and the combination of stud 140 and hand-operated nut 174 are configured such that the cover flexes slightly with the cassette in place and with the hand-operated nut 174 securely engaged thereagainst whereby to exert pressure against the cassette. As of the previous embodiment, the longitudinal direction of the aligning surfaces including the aforementioned ribs and pads allows for some longitudinal sliding movement between the cassette and the frame for adjusting purposes. The chain tightening means including mechanism 58' mounted on the frame, and the further chain tightening mechanism mounted on the cassette including spring biased shoe 98' disengaged by dog 108', are substantially the same as referenced in the previous embodiment by corresponding unprimed reference numerals. Again, when the cassette is mounted on the frame the dog forces the shoe out of engagement with the saw chain sprocket so the same may be driven by the splined motor shaft.

While I have shown and described plural embodiments of my invention, it will be apparent to those skilled in the art that many other changes and modifications may be made without departing from my invention in its broader aspects. I therefore intend the appended claims to cover all such changes and modifications as fall within the true spirit and scope of my invention.

What is claimed is:

1. In a chain saw including a frame and having a driving motor,
   a saw chain cassette comprising a saw bar having a saw chain entrained therearound and a sprocket for engaging said chain and adapted to be driven by said motor,
   and a movable clamping cover adapted for interengagement with said frame while receiving said cassette between said cover and said frame in position for said sprocket to be driven by said motor, wherein said clamping cover removably secures said cassette against said frame by releasable compression to provide for rapid insertion and removal of said cassette,
   said cover and said frame having pads for engaging sides of said cassette, said cassette having longitudinal alignment ribs with which said pads are matingly cooperable for holding said cassette against rotation.

2. The apparatus according to claim 1 wherein said motor and said sprocket are provided with a splined interconnection positioned for mating relation as said cassette is mounted on said frame.

3. The apparatus according to claim 1 wherein said cassette includes a sprocket entrapping portion for receiving said sprocket, said ribs being located forward and rearward of said sprocket on said sprocket entrapping portion, said pads being matingly receivable between said ribs both forward and rearward of said sprocket on said sprocket entrapping portion.

4. The apparatus according to claim 1 wherein said frame is further provided with ridges on either side of said pads cooperating with said pads to form grooves receiving said ribs on said cassette.

5. The apparatus according to claim 1 wherein said cover is hingedly attached to said frame and is provided with releasable locking means for holding said cover against said frame with said cassette in place.

6. The apparatus according to claim 1 wherein said cover is hingedly attached to said frame and is provided with an aperture, while said frame is provided with a threaded connection for passing through said aperture and releasably holding said cover against said frame with said cassette in place.

7. The apparatus according to claim 1 wherein said sprocket is relatively movable along said cassette, and said frame rearward of said cassette is provided with means for adjustably bearing on said cassette rearward of said sprocket and urging said saw bar forwardly relative to said chain as engaged by said sprocket.

8. The apparatus according to claim 7 further including a chain tightening mechanism for said cassette adapted to maintain said chain in tensioned relation entrained around said saw bar when said cassette is removed from said frame, said chain tightening mechanism comprising biasing means located on said cassette for yieldably urging said sprocket in a rearward direction along said cassette for tightening said chain, and a cam member mounted on said frame for disengaging said chain tightening mechanism when said cassette is mounted on said frame.

9. The apparatus according to claim 1 wherein said sprocket is relatively movable along said cassette, and further including a chain tightening mechanism for said cassette adapted to maintain said chain in tensioned relation entrained around said saw bar when said cassette is removed from said frame, said chain tightening mechanism comprising means located on said cassette for yieldably urging said sprocket in a rearward direction along said cassette for tightening said chain.

10. The apparatus according to claim 9 further including a cam member mounted on said frame for disengaging said chain tightening mechanism when said cassette is mounted on said frame.

11. The apparatus according to claim 10 wherein said biasing means includes a shoe slidably mounted on said cassette for engaging the periphery of said sprocket on the forward side thereof and a spring for urging said shoe rearwardly against said sprocket, and said cam member comprising a dog fixedly mounted on said frame, said dog and said shoe having cammed interengaging surfaces by means of which said shoe is moved forwardly away from said sprocket when said cassette is mounted on said frame.

12. The apparatus according to claim 1 further including an adjustable sharpening mechanism attached to said frame for bearing on said chain adjacent said sprocket with said cassette in position on said frame, a portion of the inside wall of said cassette facing said frame being indented to expose said chain in the area of said sharpening mechanism.

13. In a chain saw including a frame and having a driving motor,
a saw chain cassette comprising a saw bar having a saw chain entrained therearound and a sprocket for engaging said chain and adapted to be driven by said motor,
and a movable clamping cover adapted for interengagement with said frame while receiving said cassette between said cover and said frame in position for said sprocket to be driven by said motor, wherein said clamping cover removably secures said cassette against said frame by releasable compression to provide for rapid insertion and removal of said cassette, wherein said cover is hingedly attached to said frame and is provided with an over-center locking mechanism for releasably holding said cover against said frame with said cassette in place.

14. The apparatus according to claim 13 wherein said cassette has aligning surfaces which are engaged as said cassette is secured against said frame for accurately positioning and holding said cassette.

15. The apparatus according to claim 13 wherein said sprocket is relatively movable along said cassette, and further including a chain tightening mechanism for said cassette adapted to maintain said chain in tensioned relation entrained around said saw bar when said cassette is removed from said frame, said chain tightening mechanism including biasing means located on said cassette for yieldably urging said sprocket in a rearward direction along said cassette for tightening said chain, and a cam member mounted on said frame for disengaging said chain tightening mechanism when said cassette is mounted on said frame.

16. The apparatus according to claim 15 wherein said frame rearward of said cassette is provided with means for adjustably bearing on said cassette rearward of said sprocket and urging said saw bar forwardly relative to said chain as engaged by said sprocket.

17. In a chain saw including a frame and having a driving motor,
a saw chain cassette removably mountable on said frame as a unit, said cassette comprising a saw bar having a saw chain entrained therearound and a sprocket for engaging said chain and adapted to be driven by said motor, said sprocket being relatively movable along said cassette,
and biasing means located on said cassette for yieldably urging said sprocket in a rearward direction along said cassette for maintaining said chain in tensioned relation as entrained around said saw bar when said cassette is removed from said frame.

18. The apparatus according to claim 17 further including a cam member mounted on said chain saw for disengaging said biasing means when said cassette is mounted on said frame.

19. The apparatus according to claim 17 wherein said frame rearward of said cassette is provided with means for adjustably bearing on said cassette rearward of said sprocket and urging said saw bar forwardly relative to said chain as engaged by said sprocket.

20. The apparatus according to claim 19 wherein said cassette is provided with aligning surfaces engaged as said cassette is mounted on said frame for accurately positioning and holding said cassette, said aligning surfaces extending in a direction generally longitudinal of said cassette to facilitate longitudinal adjustment of said cassette relative to said chain.

21. The apparatus according to claim 20 wherein said cassette includes a sprocket entrapping portion for receiving said sprocket, said aligning surfaces including ribs on said cassette forward and rearward of said sprocket entrapping portion,
said apparatus being provided with a clamping cover adapted for interengagement with said frame while removably receiving said cassette between said cover and said frame in position for said sprocket to be driven by said motor,
said cover and said frame having pads matingly receivable between said ribs for holding said cassette.

22. A saw chain cassette for use with a chain saw having a driving motor, said cassette comprising a saw bar having a saw chain entrained therearound and a sprocket for engaging said chain and adapted to be driven by said motor, said sprocket being relatively movable along said cassette, and biasing means located on said cassette for yieldably urging said sprocket in a rearward direction along said cassette for maintaining said chain in tensioned relation as entrained around said saw bar when said cassette is removed from said frame.

* * * * *